(12) United States Patent
Tanioka et al.

(10) Patent No.: US 7,213,487 B2
(45) Date of Patent: May 8, 2007

(54) ACTUATOR HAVING WAVE GEAR REDUCTION DRIVE

(75) Inventors: Yoshihiro Tanioka, Nagano (JP); Kiyoto Kobayashi, Nagano (JP)

(73) Assignee: Harmonic Drive Systems, Inc., Tokyo (JP)

( * ) Notice: Subject to any disclaimer, the term of this patent is extended or adjusted under 35 U.S.C. 154(b) by 237 days.

(21) Appl. No.: 11/107,292

(22) Filed: Apr. 15, 2005

(65) Prior Publication Data
US 2005/0235774 A1    Oct. 27, 2005

(30) Foreign Application Priority Data
Apr. 23, 2004    (JP)    ............. 2004-127498

(51) Int. Cl.
*F16H 37/00*    (2006.01)
(52) U.S. Cl. .................................... 74/640
(58) Field of Classification Search ............. 74/640; 475/149, 162
See application file for complete search history.

(56) References Cited

U.S. PATENT DOCUMENTS

| | | | |
|---|---|---|---|
| 4,096,766 A | * | 6/1978 | Pardo et al. ............... 74/640 |
| 4,678,952 A | * | 7/1987 | Peterson et al. ............... 310/83 |
| 5,906,142 A | * | 5/1999 | Shirasawa ............... 74/640 |
| 6,258,007 B1 | * | 7/2001 | Kristjansson ............... 477/7 |
| 6,701,803 B1 | * | 3/2004 | Tamai et al. ............... 74/640 |

FOREIGN PATENT DOCUMENTS

JP    2002-243000    8/2002

\* cited by examiner

*Primary Examiner*—Ha Ho
(74) *Attorney, Agent, or Firm*—Flynn, Thiel, Boutell & Tanis, P.C.

(57) ABSTRACT

An actuator has a motor and a wave gear reduction drive in which a wave generator is coaxially connected to an output shaft protruding forward from a front surface thereof. A shaft portion of the output shaft coaxially extends through inside a cylindrical trunk in the flexible internal gear of the wave gear reduction drive, and a magnetic encoder for detecting the rotation of the output shaft is mounted on the shaft portion. Since the dead space inside the cylindrical trunk is used as the space for disposing the magnetic encoder, an entire length can be reduced in comparison with an actuator in which the motor, the wave gear reduction drive, and the encoder are arranged in the axial direction.

1 Claim, 1 Drawing Sheet

ACTUATOR HAVING WAVE GEAR REDUCTION DRIVE

BACKGROUND OF THE INVENTION

1. Field of the Invention

The present invention relates to an actuator provided with a motor and a wave gear reduction drive, and pertains to an actuator provided with an encoder for detecting the rotational speed or the like of an output shaft of the motor.

2. Description of the Related Art

A wave gear reduction drive has an annular rigid internal gear, a flexible external gear disposed on an internal side thereof, and a wave generator that causes the flexible external gear to flex in a radial direction and to mesh with the rigid internal gear, and moves meshing positions of both gears in a circumferential direction. In an actuator provided with the wave gear reduction drive, an output shaft of a motor is coaxially connected to the wave generator, and considerably reduced rotations are output in accordance with the difference in the number of teeth of both gears from the rigid internal gear or the flexible external gear.

In an actuator with this configuration, an optical encoder is mounted on the motor output shaft, and motor drive control is performed based on the output thereof, as disclosed in JP-A 2002-243000, for example. The optical encoder is coaxially mounted on an end portion of the motor output shaft, that is, on an end portion of the motor on a side opposite from the side to which the reduction drive is connected.

In an actuator provided with a wave gear reduction drive according to the prior art, a wave gear reduction drive, a motor, and an optical encoder are coaxially arranged in this order. Since these elements are coaxially arranged along the axial direction of the actuator, the entire length of the actuator is increased, and there are cases in which an installation location cannot be secured.

SUMMARY OF THE INVENTION

In view of the above, a main object of the present invention is to provide an actuator that has a wave gear reduction drive in which an entire length thereof can be reduced.

Aimed at attaining the above and other objects, an actuator of the present invention has a coaxially disposed motor and wave gear reduction drive, and an encoder mounted on an output shaft of the motor, wherein the wave gear reduction drive comprises an annular rigid internal gear, a flexible external gear, and a wave generator that causes the flexible external gear to flex in a radial direction and to mesh with the rigid internal gear, and moves meshing positions thereof in a circumferential direction, the output shaft being coaxially connected to the wave generator;

the flexible external gear comprises a cylindrical trunk, a diaphragm that widens radially outward from one end of the cylindrical trunk, an annular boss integrally formed on an external peripheral edge of the diaphragm, and external teeth formed on an external peripheral surface of the other end in the cylindrical trunk; and the encoder is a magnetic encoder mounted on a shaft portion coaxially disposed inside the cylindrical trunk on the output shaft.

In the actuator provided with the wave gear reduction drive according to the present invention, the encoder is mounted on the output shaft portion of the motor coaxially disposed inside the cylindrical trunk in the flexible external gear of the wave gear reduction drive. The entire length of the actuator can be reduced by an amount equal to a shaft length of the encoder by using a space inside the cylindrical trunk as a space for disposing the encoder. The inside of the cylindrical trunk is commonly lubricated with oil, and when the optical encoder is mounted, the light-emitting element, photoelement, or the like becomes soiled by the lubricating oil, making it impossible to obtain appropriate output and bringing about other drawbacks. However, in the present invention, since a magnetic encoder which is resistant to oil and other soiling is mounted, the above-described problem can be avoided.

DESCRIPTION OF THE PREFERRED EMBODIMENTS

Figure 1:
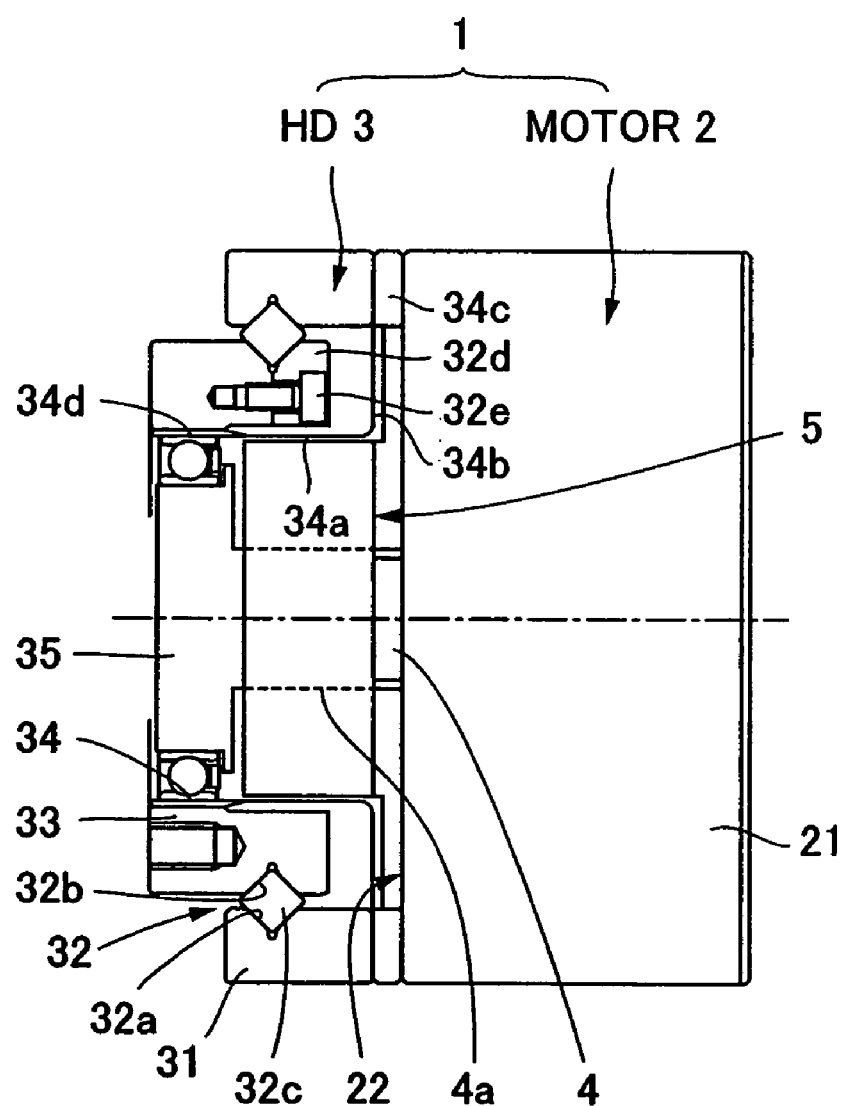
FIG. 1 is a schematic structural diagram of an actuator according to the present invention.

An example of an actuator provided with a wave gear reduction drive according to the present invention is described below with reference to the drawings. FIG. 1 is a schematic diagram of the actuator of the present example. An actuator 1 has a motor 2, a wave gear reduction drive (HD) 3 coaxially arranged and fixedly connected to the front surface of the motor, and a magnetic encoder 5 for obtaining rotation information about an output shaft 4 of the motor 2.

The motor 2 has a cylindrical motor case 21 and a mounting flange 22 mounted on a front end thereof, and the output shaft 4 coaxially protrudes forward from a center of the mounting flange 22. The wave gear reduction drive 3 has an cylindrical reduction gear case 31, an annular rigid internal gear 33 rotatably supported in a coaxial state via a cross roller bearing 32 inside the reduction gear case 31, a flexible external gear 34 coaxially disposed inside the rigid internal gear 33, and an elliptically contoured wave generator 35 fitted inside the flexible external gear 34.

The reduction gear case 31 doubles as an outer ring of the cross roller bearing 32, and a raceway surface 32a is formed on an internal peripheral surface of the reduction gear case 31. The rigid internal gear 33 doubles as an inner ring of the cross roller bearing 32, and a raceway surface 32b is formed on an external peripheral surface of the rigid internal gear 33. An insertion hole for inserting rollers 32c of the cross roller bearing 32 is sealed by a plug 32d, and the plug 32d is fastened and fixed to the rigid internal gear 33 by a bolt 32e.

The flexible external gear 34 has a cylindrical trunk 34a, an annular diaphragm 34b that widens radially outward from an end on a rear end side in the cylindrical trunk 34a, an annular boss 34c continuously formed on an external peripheral edge of the diaphragm 34b, and external teeth 34d formed on an external peripheral surface of an open end on a front side of the cylindrical trunk 34a. The boss 34c is sandwiched between the reduction gear case 31 and the mounting flange 22 from the front and rear, and is fastened and fixed in this state by a fastening bolt (not shown).

The output shaft 4 of the motor is coaxially inserted from the rear end side of the cylindrical trunk 34a of the flexible external gear 34, and is fixedly connected to the wave generator 35 fitted into the front end side of the cylindrical trunk 34a. The magnetic encoder 5 is mounted onto a shaft portion 4a of the output shaft 4 positioned inside the cylindrical trunk 34a.

In the actuator 1 of the present example, the dead space inside the cylindrical trunk 34a in the flexible external gear 34 of the wave gear reduction drive 3 is used as the space for disposing the magnetic encoder 5. Therefore, the entire length of the actuator 1 is not increased by the amount equal to the axial length of the magnetic encoder 5, as is the case when the magnetic encoder 5 is coaxially mounted on the rear end portion of the motor 2. Hence, the actuator 1 with the short overall length provided with the wave gear reduction drive 3 can be realized.

An inside of the wave gear reduction drive 3 is lubricated with a lubricating oil, and the magnetic encoder 5 disposed inside the cylindrical trunk 34a is also exposed to the lubricating oil. However, since the magnetic encoder 5 is resistant to soiling with oil and the like in comparison with the optical encoder used in common practice, it is possible to prevent the output from being reduced or other drawbacks from occurring due to soiling with oil.

What is claimed is:

1. An actuator having a coaxially disposed motor and wave gear reduction drive, and an encoder mounted on an output shaft of the motor, wherein the wave gear reduction drive comprises an annular rigid internal gear, a flexible external gear, and a wave generator that causes the flexible external gear to flex in a radial direction and to mesh with the rigid internal gear, and moves meshing positions thereof in a circumferential direction, the output shaft being coaxially connected to the wave generator;

the flexible external gear comprises a cylindrical trunk, a diaphragm that widens radially outward from one end of the cylindrical trunk, an annular boss integrally formed on an external peripheral edge of the diaphragm, and external teeth formed on an external peripheral surface of the other end in the cylindrical trunk; and the encoder is a magnetic encoder mounted on a shaft portion coaxially disposed inside the cylindrical trunk on the output shaft.

* * * * *